Figure 1:
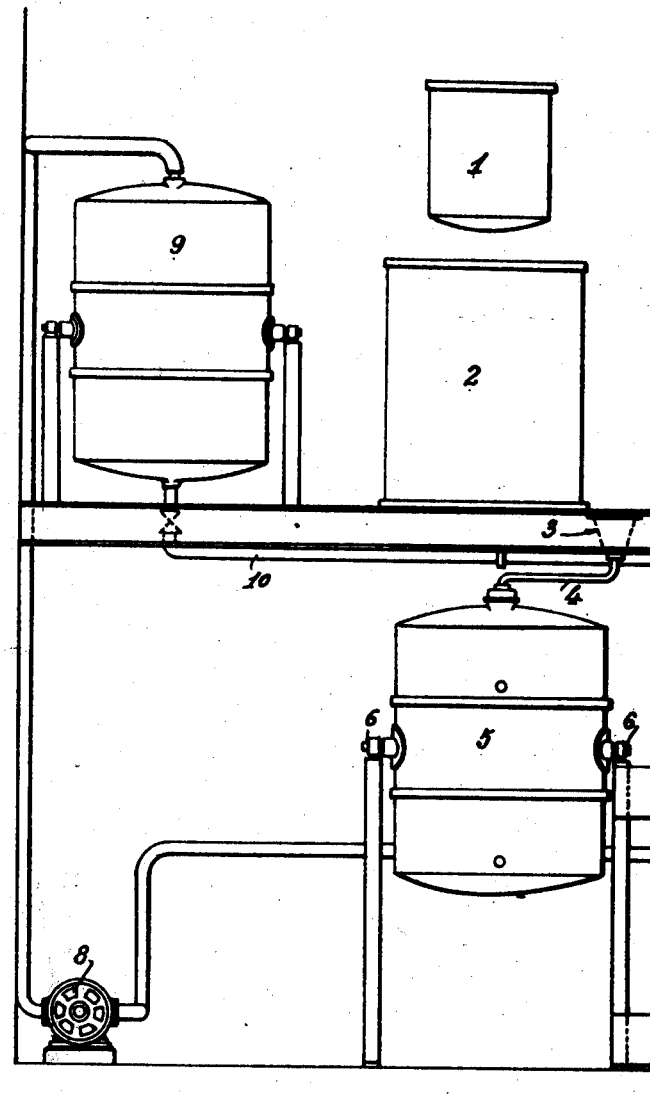

May 8, 1928.

C. POLLACCHI 1,668,603

PROCESS FOR EXTRACTING COLORING MATTER FROM HENNA LEAVES
AND IMPROVED PLANT THEREFOR

Filed June 29, 1925

2 Sheets-Sheet 1

INVENTOR
Charles Pollacchi
BY Townsend+Decker
ATTORNEYS.

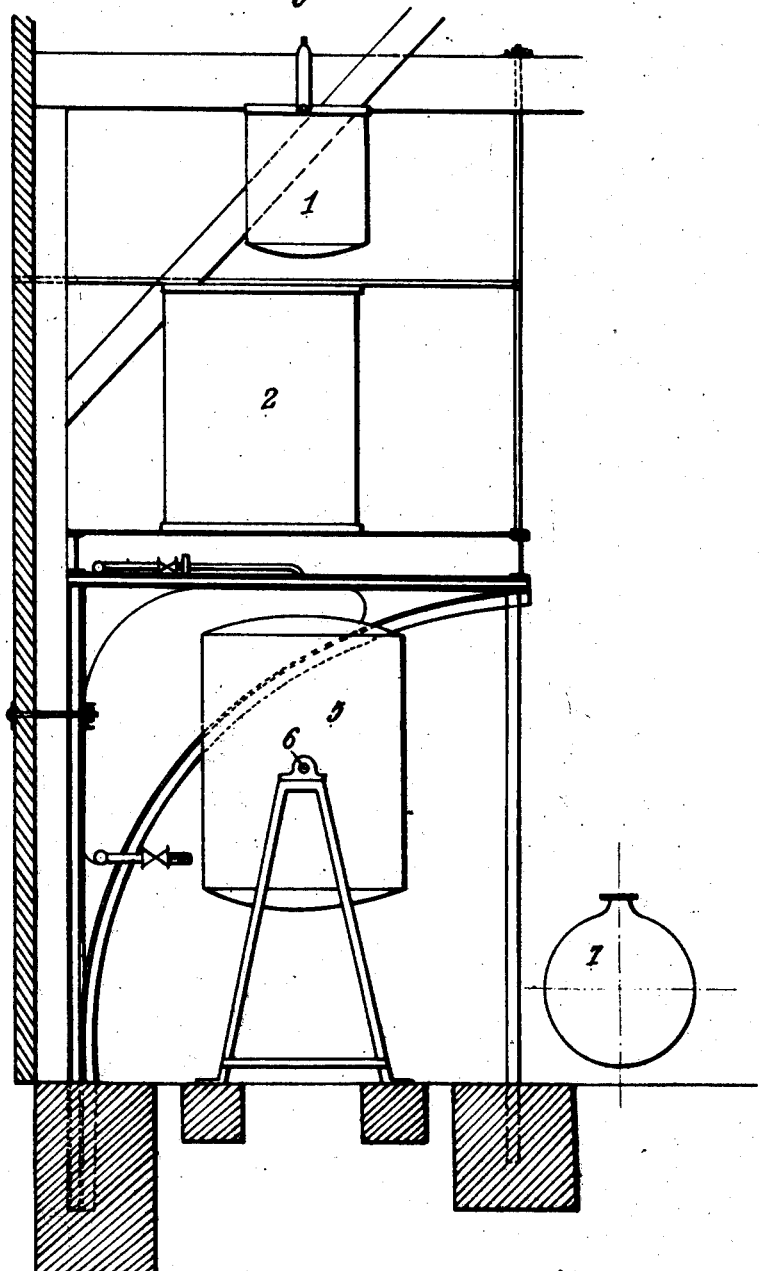

Patented May 8, 1928.

1,668,603

UNITED STATES PATENT OFFICE.

CHARLES POLLACCHI, OF PARIS, FRANCE, ASSIGNOR TO COTY SOCIÉTÉ ANONYME, OF SURESNES, FRANCE.

PROCESS FOR EXTRACTING COLORING MATTER FROM HENNA LEAVES AND IMPROVED PLANT THEREFOR.

Application filed June 29, 1925, Serial No. 40,154, and in France July 2, 1924.

This invention has for its object a process for allowing the commercial extraction of coloring matter from henna leaves.

One of the main difficulties encountered in the extraction of coloring matter from henna and which tends to prevent the obtainment of a proper yield consists in separating the coloring matter from the tannins with which it forms complex compounds.

A process according to this invention allows the coloring matter of henna to be separated almost wholly from the tannins and it consists in exhausting (either in the cold or preferably with heat) the henna leaves with water rendered alkaline by a soluble alkaline salt; this exhaustion may or may not be preceded by a preliminary exhaustion with warm water.

The extraction of the coloring matter of henna from the aqueous liquids thus obtained is effected by acidulating the liquor so obtained and treating these previously acidulated liquors with a volatile solvent insoluble in water. The volatile solvent may then be exhausted by treating the solution obtained with an alkaline salt and the coloring matter may be precipitated from the decanted aqueous solution by an acid; it is then only necessary to filter and to dry the precipitate.

As volatile solvent insoluble in water there may be employed, for example, benzine, trichlorethylene or other similar product.

The operations may, for example, be carried out as follows:—

Henna leaves suitably crushed and ground to powder so as to pass through a No. 8 sieve are exhausted either with cold water or water preferably heated to 60° C. and rendered alkaline with about 3% of an alkaline salt such as anhydrous soda carbonate. A substantial quantity of alkalinized water should be employed and this may attain about 17 times the weight of the henna leaves.

This exhaustion with alkalinized water may be preceded by an exhaustion of the henna leaves with water heated to about 60°, for example, in the proportion of 14 times their weight for example. When the coloration of the liquid becomes less intense there is added to the leaves about 250 grs. of sodium carbonate for 25 kgs. of the henna treated and the exhaustions are continued for one hour; there is again added the same proportion of sodium carbonate and the treatment should be completed by a rapid lixiviation with water for displacing the liquid still retained by the henna leaves.

It will be seen that in these operations suitable quantities of liquid are employed and the exhaustions should be prolonged for the necessary time; the total duration of these operations may be seven hours and even more.

The successive macerations of the henna leaves may be effected with variable quantities of alkaline liquid and for periods of time which may be the same or which may differ or in other manner.

The extraction of the coloring matter of henna from the exhaustion liquors may be effected as follows:—

The exhaustion liquors are acidulated with a mineral acid (hydrochloric acid for example) until a clearly red coloration of blue litmus paper is obtained.

After standing they are filtered through woollen fabric, for example, and the filtration liquor is agitated with a volatile solvent insoluble in water, (trichlorethylene, for example) in the proportion of 1 litre of solvent for four litres of liquor to be treated. When a larger proportion of solvent is employed the duration of the operation may be abridged.

The bath is allowed to stand for a moment, the coloring matter retained by the volatile solvent then being isolated by agitation with an aqueous solution of sodium carbonate, for example, a 3% solution, or with an alkaline salt, and then decanted.

Preferably several successive exhaustions of this type are carried out for extracting the coloring matter of henna from the volatile solvent, agitating each time with a solution of sodium carbonate or other salt and then decanting.

The red solutions obtained at the finish of such successive decantations are added together; they contain the coloring matter of henna which is precipitated by the addition of a mineral acid (hydrochloric acid, for example) until precipitation is complete.

The precipitate is filtered and dried at a low temperature.

The mother liquors still retaining coloring matter of henna are again treated as above described.

The volatile solvent, such as trichlorethylene remains undeteriorated by the contact with water and may be recovered and used again for subsequent extractions.

The successive steps of the operation given above are:

1. Exhausting the leaves either in the cold or preferably with heat with water, said water being rendered alkaline with a soluble alkaline salt (anhydrous sodium carbonate, for instance);
2. Acidulating the liquor so obtained;
3. Treating the liquor with a volatile solvent insoluble in water;
4. Treating the solvent portion with an alkaline salt solution;
5. Separating said solution and
6. Treating it with an acid.

The plant employed for carrying the process into effect is illustrated in the accompanying drawing, in which Figure 1 is a front elevation and Figure 2 is a side elevation partly in section.

Referring to this drawing, 1 is a container in which are placed the crushed henna leaves to be exhausted. Alkalinized water is introduced into this container or successively hot water and then alkalinized water, the exhaust liquors flowing into a container 2 whose volume is such that it can receive the whole quantity of these liquids which, as above explained, is very large with respect to the weight of henna treated.

After acidulation with hydrochloric acid, for example, the exhaustion liquids flow into the filtering cone 3, the filtrate passing through the pipe 4 into a cylinder 5 which can oscillate about trunnions 6. The treatment with the insoluble volatile solvent, such as trichlorethylene, for example, takes place in cylinder 5.

The solutions containing the coloring matter are poured from cylinder 5 into a container 7 where the coloring matter is precipitated.

The volatile solvent is by a pump 8 delivered into a common solvent reservoir 9 from which it is distributed through a pipe 10 to the various cylinders 5.

Several such apparatus may be grouped side by side to form an installation which will allow large quantities of henna leaves to be treated at the same time.

In this case there may be one solvent reservoir 9 only, which may supply all the cylinders 5.

Of course the apparatus is only given by way of example and any suitable apparatus may be employed for the treatment.

What I claim is:—

1. A process for extracting coloring matter from henna leaves which consists in exhausting henna leaves with water rendered alkaline with a soluble alkaline salt, acidulating the liquor so obtained, and then extracting the coloring matter from the acidulated aqueous liquor with a volatile solvent insoluble in water.

2. A process for extracting coloring matter from henna leaves which consists in exhausting henna leaves with water rendered alkaline with a soluble alkaline salt, acidulating the liquor so obtained, then extracting the coloring matter from the acidulated aqueous liquor with a volatile solvent insoluble in water and separating the coloring matter by treatment with an alkaline salt and precipitating with an acid.

3. A process for extracting coloring matter from henna leaves which consists in exhausting henna leaves with water rendered alkaline with a soluble alkaline salt, acidulating the liquor so obtained, and then extracting the coloring matter from the acidulated aqueous liquor with trichlorethylene.

4. A process for extracting coloring matter from henna leaves which consists in exhausting henna leaves with water rendered alkaline with a soluble alkaline salt, acidulating the liquor so obtained, then extracting the coloring matter from the acidulated aqueous liquor with trichlorethylene, and separating the coloring matter by treatment with an alkaline salt and precipitating with an acid.

5. A process for extracting coloring matter from henna leaves which consists in exhausting the henna leaves first in hot water, then with water rendered alkaline with a soluble alkaline salt, acidulating the liquor so obtained, and then extracting the coloring matter from the acidulated aqueous liquor with a volatile solvent insoluble in water.

6. A process for extracting coloring matter from henna leaves which consists in exhausting the henna leaves first in hot water, then with water rendered alkaline with a soluble alkaline salt, acidulating the liquor so obtained, then extracting the coloring matter from the acidulated aqueous liquor with a volatile solvent insoluble in water and separating the coloring matter by treatment with an alkaline salt and precipitating with an acid.

7. A process for extracting coloring matter from henna leaves which consists in exhausting the henna leaves first in hot water, then with water rendered alkaline with a soluble alkaline salt, acidulating the liquor so obtained, and then extracting the coloring matter from the acidulated aqueous liquor with trichlorethylene.

8. A process for extracting coloring matter from henna leaves which consists in exhausting the henna leaves first in hot water, then with water rendered alkaline with a soluble alkaline salt, acidulating the liquor so obtained, then extracting the coloring matter from the acidulated aqueous liquor with trichlorethylene, and separating the coloring matter by treatment with an alkaline salt and precipitating with an acid.

9. A process for extracting coloring matter from henna leaves which consists in exhausting the henna leaves rendered alkaline with a soluble alkaline salt by a number of successive steeping processes in which varying quantities of liquid are employed, acidulating the liquor so obtained, and then extracting the coloring matter from the acidulated aqueous liquor with a volatile solvent insoluble in water.

In testimony whereof I have affixed my signature.

CHARLES POLLACCHI.